United States Patent [19]
Mueller et al.

[11] Patent Number: 5,525,866
[45] Date of Patent: Jun. 11, 1996

[54] EDGE EMITTER AS A DIRECTIONAL LINE SOURCE

[76] Inventors: Gerd O. Mueller; Regina B. Mueller-Mach, both of 3491 Sweigart Rd., San Jose, Calif. 95132; Kent Vincent, 20863 Sola St., Cupertino, Calif. 95014; Paul M. Hubel, 956 Cuesta Dr., Mountain View, Calif. 94040

[21] Appl. No.: 369,598
[22] Filed: Jan. 6, 1995
[51] Int. Cl.⁶ .................................................... G09G 3/10
[52] U.S. Cl. ............................ 315/169.3; 315/169.1; 313/506; 313/505; 313/498
[58] Field of Search ........................... 315/169.3, 169.1, 315/169.2; 313/506, 509, 505, 512, 498

[56] References Cited

U.S. PATENT DOCUMENTS

| | | | |
|---|---|---|---|
| 4,954,752 | 9/1990 | Young et al. | 315/169.3 |
| 5,043,715 | 8/1991 | Kun et al. | 340/781 |
| 5,118,987 | 6/1992 | Leksell et al. | 313/505 |
| 5,124,543 | 6/1992 | Kawashima | 250/208.1 |
| 5,146,082 | 9/1992 | Abe | 250/227.20 |
| 5,227,696 | 7/1993 | Asars | 315/169.3 |
| 5,252,895 | 10/1993 | Leksell et al. | 313/506 |

*Primary Examiner*—Robert Pascal
*Assistant Examiner*—Haissa Philogene

[57] ABSTRACT

A broadband line source that is directional, rugged, compact, spatially and temporally uniform, stable, without the need for warmup, and relatively easy to implement. The source can be in single-color or multi-color, and it can be used, for example, in a scanner. In one embodiment, the line source includes a first thin-film electroluminescent stack with at least a bottom electrode, a top electrode, and a first active film between the two electrodes. The active film generates radiation in an area that has a width and a length, with the length being larger than the width. The length of the area sets the length of the line radiation, which is substantially homogenous along the line. In another embodiment, three of such stacks are encapsulated through thin-film processes by a cap, which sits on a substrate. The cap has one side surface that is more transmissive to radiation. The generated radiation is directed by the cap to be emitted at the more transmissive side surface to produce a single-color or a multi-color line source.

20 Claims, 14 Drawing Sheets

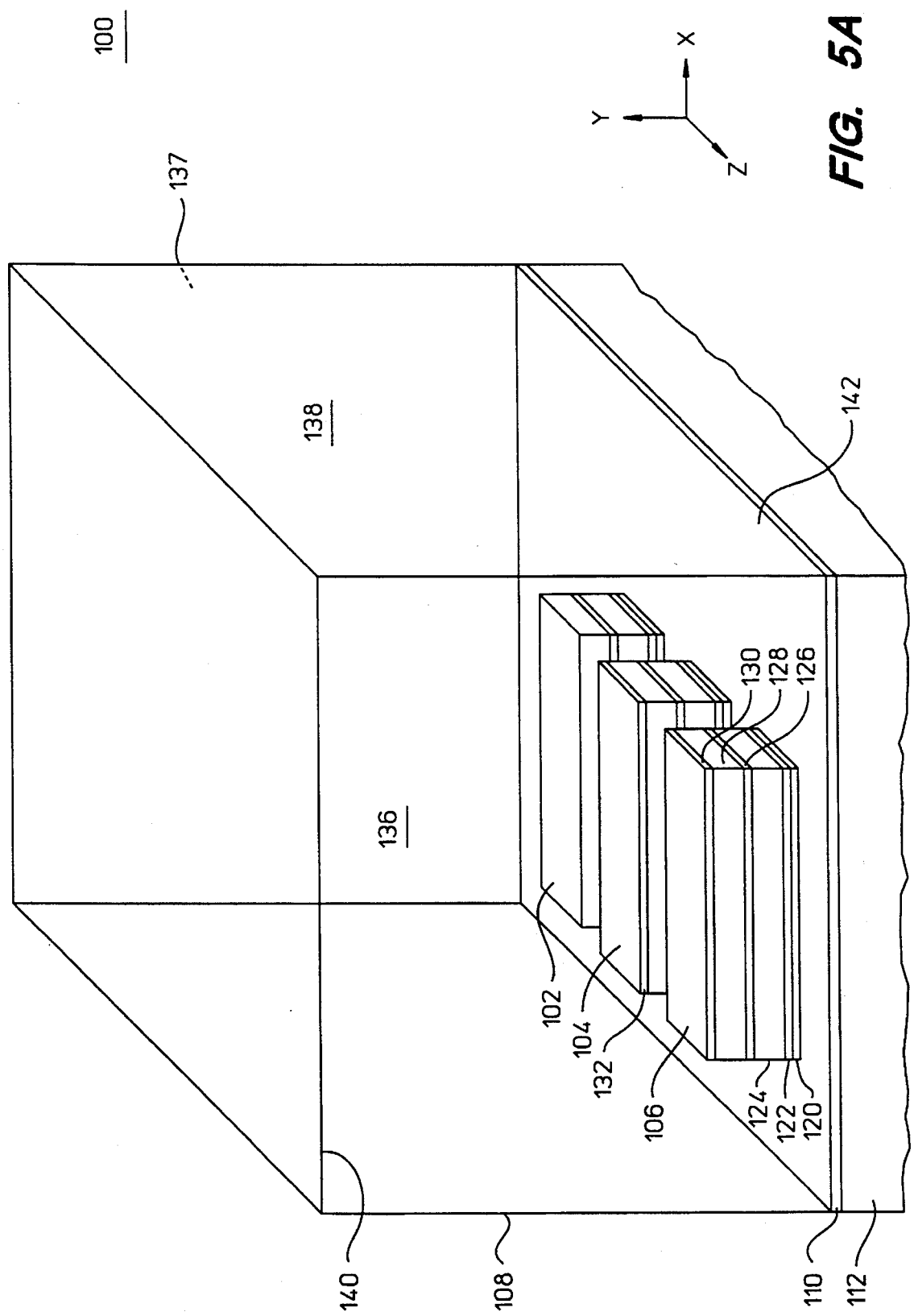

EDGE EMITTER AS A DIRECTIONAL LINE SOURCE

CROSS REFERENCE TO RELATED APPLICATION

The present invention is related to a commonly assigned and U.S. application entitled, "Capped Edge Emitter", filed on Oct. 27, 1994, with a Ser. No. 08/330,152, and invented by Mach et at.

BACKGROUND OF THE INVENTION

The present invention relates generally to edge emitters and more particularly to using an edge emitter as a line source.

For a number of years, the best light source for scanning a piece of document has been a fluorescent lamp. FIG. 1 shows such a tube fluorescent lamp. A large potential difference generated between the two electrodes at the ends of the tube breaks down a noble gas, such as argon, in the tube. Currents then conduct through the tube vaporizing and ionizing mercury droplets in the tube. When the mercury ions recombine after being excited, ultraviolet radiation is generated. The tube is coated by phosphors, which transform the incident ultraviolet radiation to visible light.

A fluorescent lamp is commonly used as the light source in an office document scanner because of its low cost relative to viable alternative light sources. However, the fluorescent lamp has some shortcomings when used for this purpose. Most notably, the fluorescent lamp is not a stable light source. It is an arc lamp, with light output highly dependent on the localized temperature dynamics of the arc, noble gas and vaporized mercury. Consequently, the light intensity from the lamp varies both spatially and temporally along the length of the lamp. Such variation degrades the accuracy of scanned images. Also, the fluorescent lamp should be warmed-up prior to use, as the heat generated from the arc has to vaporize and uniformly distribute the otherwise liquid drops of mercury. Moreover, the fluorescent lamp is quite bulky and should be shielded to protect the scanner sensor from heat and stray light.

The problems are intensified in a color scanner as shown in FIG. 2A. In such a scanner, one typically needs three different broadband illuminators as the source to cover the visible spectrum. To scan the color of an area, each illuminator sequentially shines onto it. Reflections from each illuminator are measured to reconstruct the color of the area.

Normally, fluorescent lamps are broadband devices. Typically, the phosphors in each lamp are selected to irradiate in the red, green or blue of the visible spectrum, so that the three lamps fully cover the visible spectrum. In a prior art embodiment, the three lamps are put into an optical system so that they all illuminate a common scan line on an object, and the reflected light is measured by a sensor. This system works, but may be inaccurate, wasteful and complicated because in addition to all the above-identified difficulties of fluorescent lamps, the phosphors in each lamp age at different rates. This can lead to color error. Also, as shown in FIG. 2A, the light generated by each lamp is not directional. In scanning, one is looking at specific areas. The light that is not pointed towards those areas is wasted. In fact, such wasted light power usually tends to generate unwanted heat. Thermal isolation may be required.

FIG. 2B shows another prior art method using a single white light fluorescent lamp as the source of a typical scanner. In this example, the reflected beam is split into different paths to be measured by sensors that are sensitive to different colors. The difference in sensitivity to different colors may be achieved by placing different filters over the sensors. This method again incurs the weaknesses of a fluorescent lamp.

Note that lasers or light-emitting-diodes (LEDs) are not very suitable as broadband illuminators. This is because both lasers and LEDs are inherently narrow-band devices. If the source is made up of a red, a green and a blue LED, color error may occur for an object area that is not primarily red or green or blue.

It should be apparent from the foregoing that there is still a need for a broadband light source that is stable, spatially and temporally uniform, rugged, efficient, compact, relatively easy to implement and requires no warmup period. Preferably, the source can illuminate in different colors.

SUMMARY OF THE INVENTION

The present invention provides a broadband, directional, thin-film line source that is stable, spatially and temporally uniform, rugged, efficient, compact, relatively easy to implement and requires no warmup period. Also, at least some embodiments of the invention can illuminate in white light or in many colors.

The light source is a thin-film electroluminescent edge emitter, with at least an active film between two electrodes. Dopant ions in the active film are excited, and when the excited ions relax, light is generated. By careful selection of the dopant ions, one can tailor the bandwidth of the emission to increase the colorimetric accuracy of the source.

The active film extends across a surface to form an emission line at an edge of the surface. The line source is very rugged because it can be made of a thin-film stack on a glass substrate. To be used in applications such as a source in a scanner, the line source is very efficient because radiation is emitted over a narrow line, which coincides with the object line to be scanned. The source is inherently stable over a broad temperature range. The temperature across the invention is fairly uniform, and there is no warmup requirement. Moreover, the light generated is both spatially and temporally uniform or homogenous because of the uniformity of the thin-film process.

The active film generates radiation in a planar surface area that has a length and a width, with the length being larger than the width. The length of the active film sets the length of the edge of the edge emitter, which sets the length of the line of radiation generated by the edge emitter. The radiation along the line is substantially homogenous.

Three or more of the above thin-film stacks can be integrated through thin-film processes to form a color line source. With all the stacks integrated in one package, the source is very compact. Although there are a number of stacks, they are all in one thin-film package with the generated radiation emitting from one edge to form the line of the line source.

One preferred embodiment of the color source includes one or more stacks under a cap, which is a term used in this application for a light guide. In the case of three stacks, each preferably radiates in one of the basic colors, which are red, green and blue.

Another preferred embodiment of the color source includes three thin-film electroluminescent stacks and two caps. The stacks are embedded between the two caps.

The first stack includes a bottom reflective electrode, a top transparent electrode, and a first active film between the two electrodes. The bottom reflective electrode is in contact with the top surface of the first cap, and the top transparent electrode is in contact with the second cap. The second stack includes a bottom transparent electrode coupled to the top surface of the first cap, a top reflective electrode, and a second active film between the two electrodes. The second stack is also coupled to a filter film so that the radiation from the second stack is filtered before entering the first cap. The third thin-film electroluminescent stack includes a bottom reflective electrode, a top transparent electrode coupled to the second cap, and a third active film between the two electrodes. The third stack is coupled to a different filter film so that the radiation from the third stack is filtered before entering the second cap.

Both caps have a number of side surfaces, a top surface and a bottom surface. The transmission of the generated radiation from the second stack is higher on one side surface of the first cap than on the other surfaces of the first cap. The more transmissive side surface of the first cap is known as the first emitting side surface, and the more reflective surfaces are known as the first reflecting surfaces. Similarly, the transmission of the generated radiation from the first and the third stack is higher on one side surface of the second cap than on the other surfaces on the second cap. The more transmissive side surface is known as the second emitting side surface, and the more reflective surfaces are known as the second reflecting surfaces. The two emitting side surfaces are adjacent and substantially parallel to each other.

The two caps gather, guide and re-direct significant portions of the radiation so that a higher percentage of the radiation generated by the stacks is emitted from the emitting side surfaces than from the reflecting surfaces. Preferably, the emitting side surfaces are in the order of tens of microns in height. With such an emitting side surfaces, the radiation from the three stacks is perceived to have a color that is the combination of the radiation from the three stacks. Thus, by electronically controlling the power of the radiation from each stack, one can control the color of the radiation from the emitting surfaces.

Other aspects and advantages of the present invention will become apparent from the following detailed description, which, when taken in conjunction with the accompanying drawings, illustrates by way of example the principles of the invention.

Same numerals in FIGS. 1–11 are assigned to similar elements in all the figures. Embodiments of the invention are discussed below with reference to FIGS. 1–11. However, those skilled in the art will readily appreciate that the detailed description given herein with respect to these figures is for explanatory purposes as the invention extends beyond these limited embodiments.

DETAILED DESCRIPTION OF THE INVENTION

Figure 1:
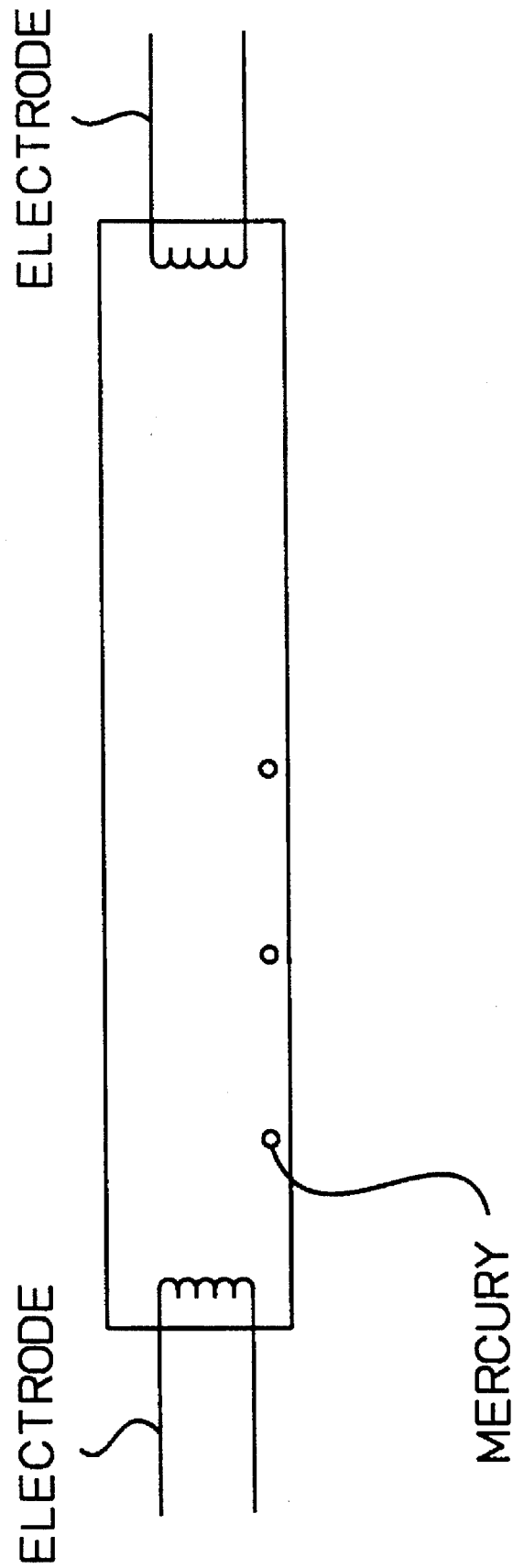
FIG. 1 shows a prior art tube fluorescent lamp.
Figure 2A:
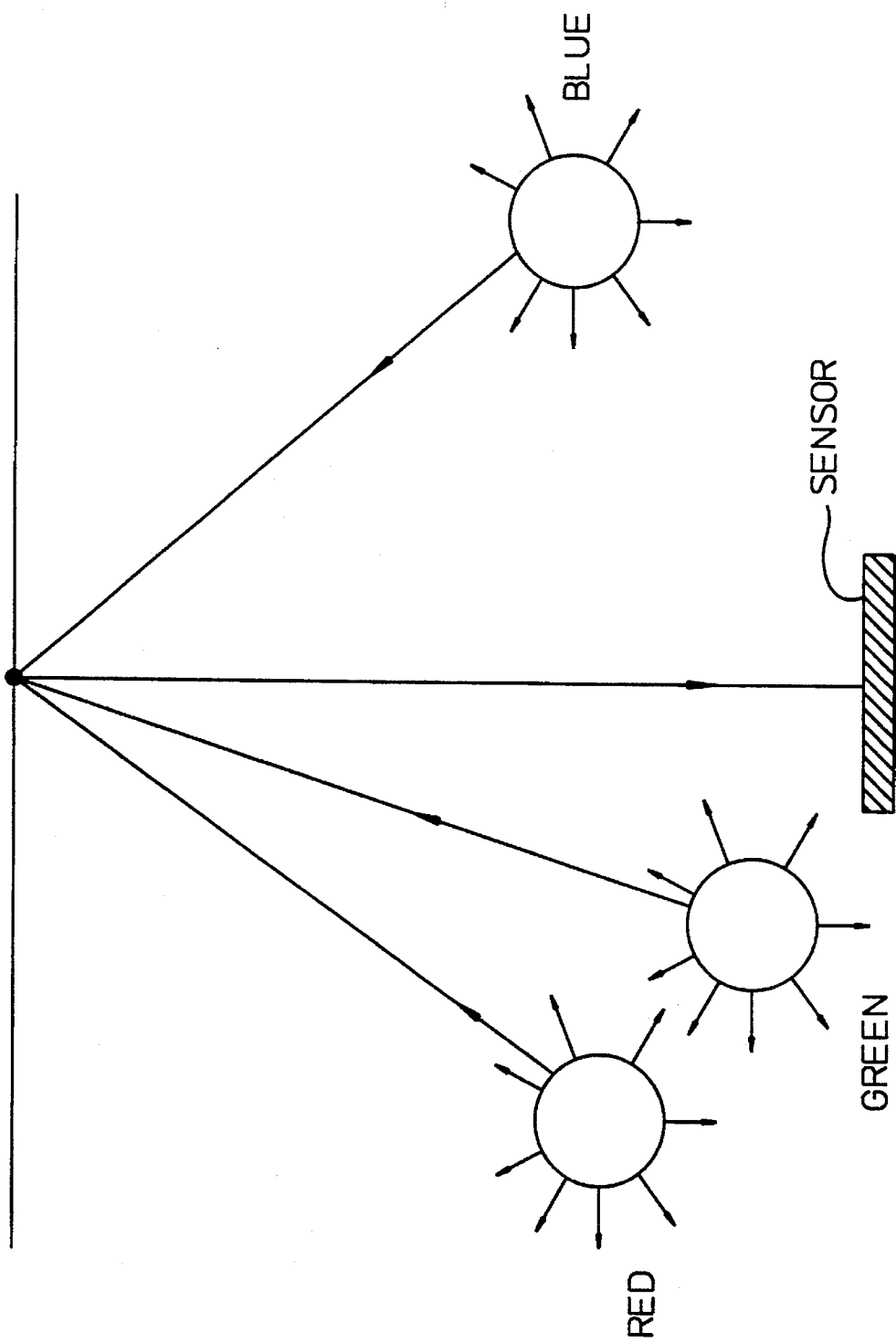
FIGS. 2(A–B) show prior art color sources using lamps.
Figure 2B:
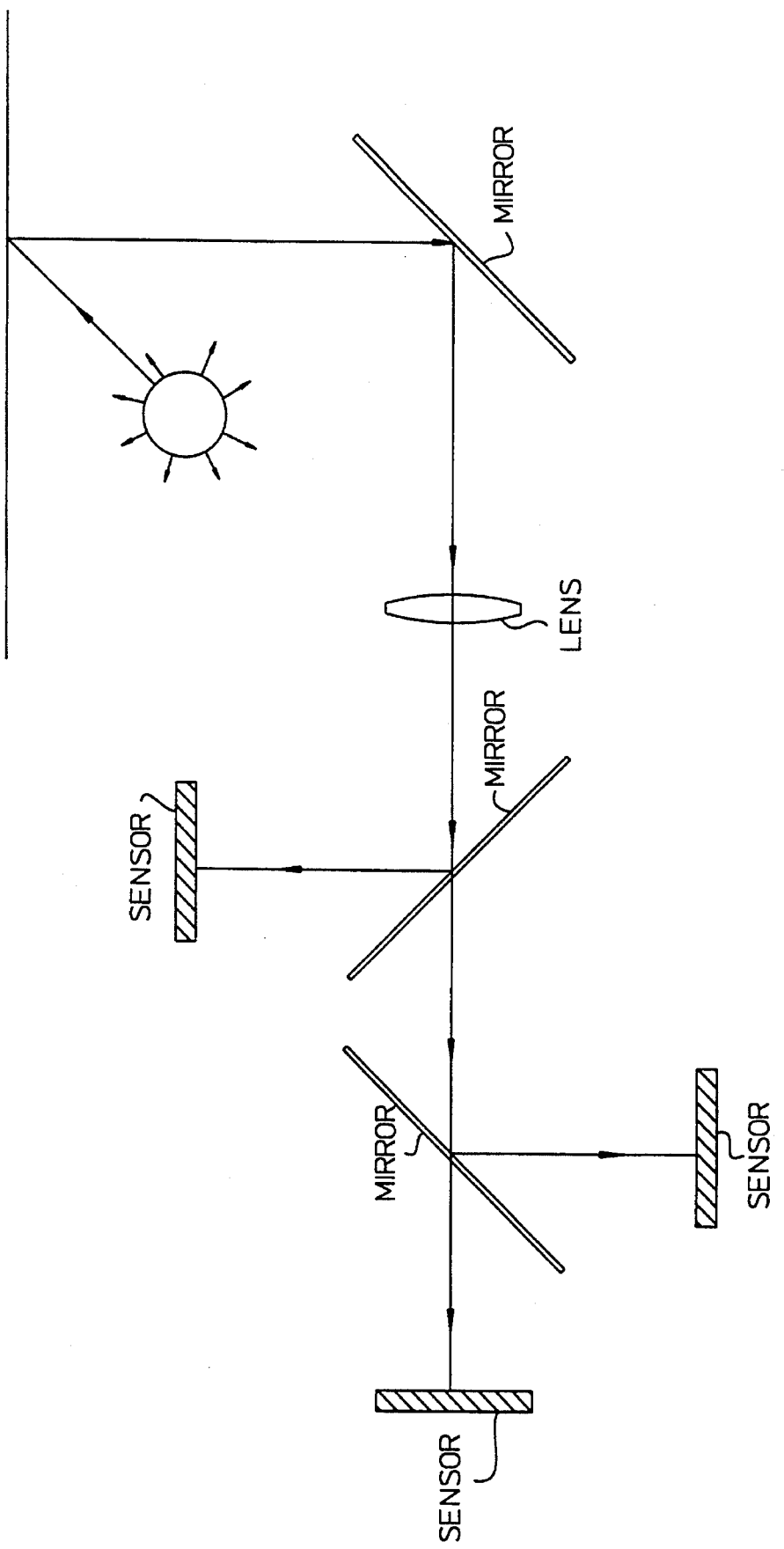
Figure 3:
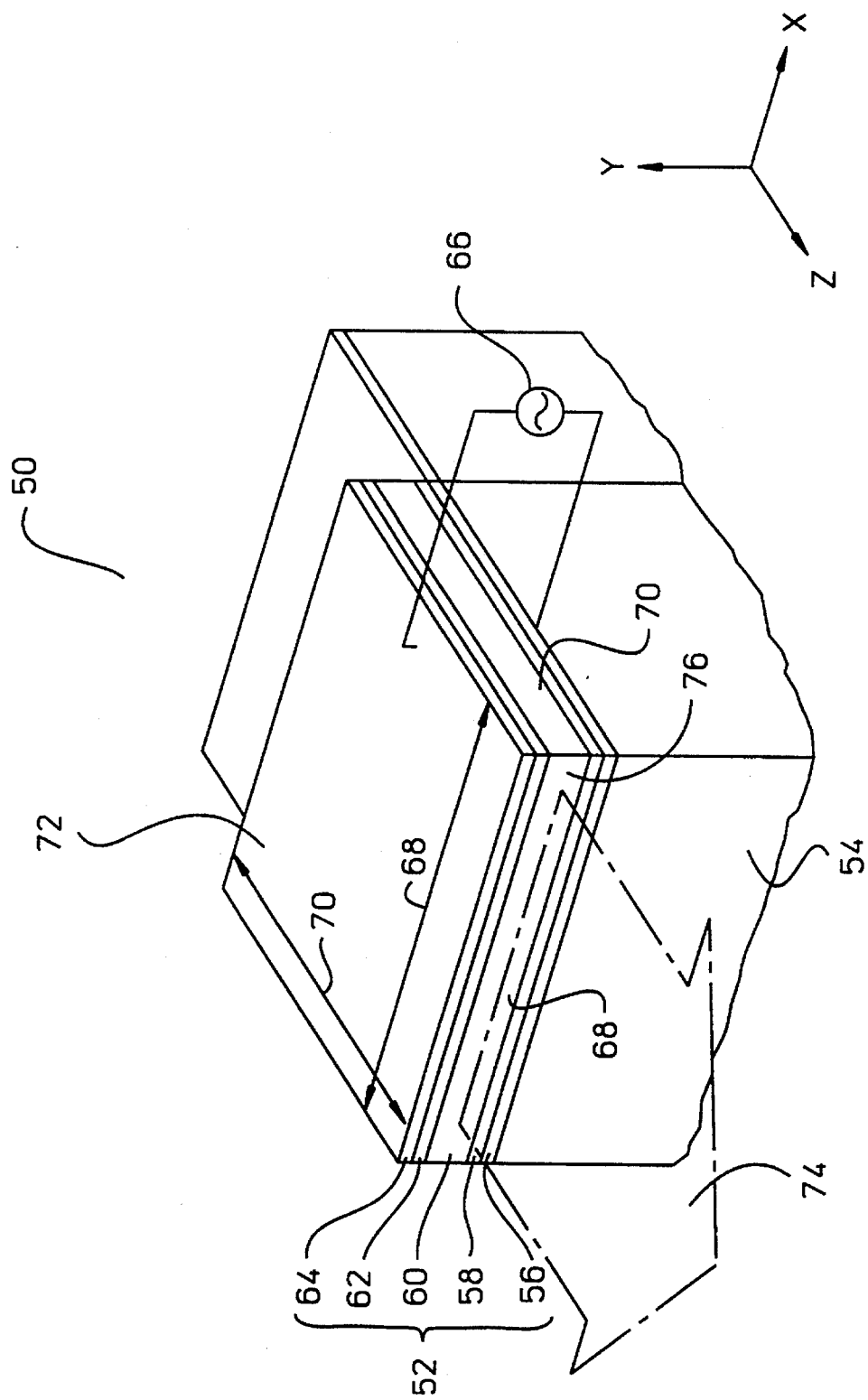
FIG. 3 shows a first preferred embodiment of the present invention.

FIG. 3 shows a first preferred embodiment 50 of the present invention. It includes a thin-film electroluminescent stack 52 on a substrate 54, such as glass. In this embodiment, the entire stack is either activated or de-activated to generate a line radiation.

The stack 52 includes a bottom reflective electrode 56, an insulating film 58, an active film 60, another insulating film 62 and a top reflective electrode 64. The bottom electrode 56 may extend over the surface of the substrate, as shown in FIG. 3.

The electrodes in the film stack are connected to a voltage source 66. The voltage of the source creates excited dopant ions in the active film. When the excited dopants relax, photon radiation is generated. By controlling the level and the frequency of the voltage, one can control the power level of the radiation emitted. Note that dopants are excited in an area 72 where the top and the bottom electrodes overlap. The area 72 has a length 68 and a width 70, with the length setting the length of the edge of the edge emitter, which sets the length of the line of radiation 74 generated by the edge emitter. In the preferred embodiment, the length 68 is larger than the width 70. In another preferred embodiment, the length is more than ten times that of the width.

It is more efficient to have the length larger than the width for a line source because the active film attenuates the generated radiation. For the radiation generated too far away from the edge of the edge emitter, it will not reach the edge. As an example, the measured attenuation length of radiation generated in a zinc sulphide active film is in the range of 0.07 to 0.5 mm, implying that there may not be a lot of advantages to have the width much more than 0.5 mm.

Typically, the electrodes and the insulating films are much thinner than the active film. Also, one of the four side surfaces of the active film 60 is more transmissive than the other side surfaces, such as the surface 68 is more transmissive than the surface 70. The more transmissive side surface is the emitting surface, and the other side surfaces are the reflecting surfaces. Different ways may be used to enhance the transmission; for example, the surface 68 may be roughened, and the other side surfaces may be plated with a reflective film.

The line source is very rugged because it can be made of a thin-film stack on a glass substrate, a ceramic substrate or other types of substrates. It is efficient because it is directional, with the light generated emitted from an edge. With light generated through electroluminescence, the source is very stable, with no nonuniform temperature rise or warmup period. Moreover, the light generated is substantially uniform or homogenous both spatially and temporally because of the uniformity of the thin-film process in making the edge emitter. However, the length of the active film is not infinite. The discontinuities at the ends of the line, such as 76, give rise to slight non-uniformities in the radiation generated in those locations. One way to reduce the non-uniformities is to increase the width of the source at the ends.

In one working embodiment, the reflecting electrode is made of aluminum; the two insulating films are made of siliconoxinitride; and the active film is made of zinc sulphide doped with manganese.

The reflecting electrode has a thickness (y-direction) of about 1000 Angstroms; the two insulating films have thicknesses of about 2000 Angstroms; and the active film is about 1 micron thick. The length of area 72 is about 200 millimeters and the width 70 is about 1 millimeter. This creates a line source that is 200 millimeters in length, with the radiation emitted from a region with a thickness of about 1 micron.

In another embodiment, there may be only one insulating film, instead of two. Although the films are described as thin-films, they are not limited to very thin layers. The films may be made by different techniques, such as by vapor-deposition or thick-film processes; and as an example, the insulating film may be as thick as ten microns.

Figure 4:
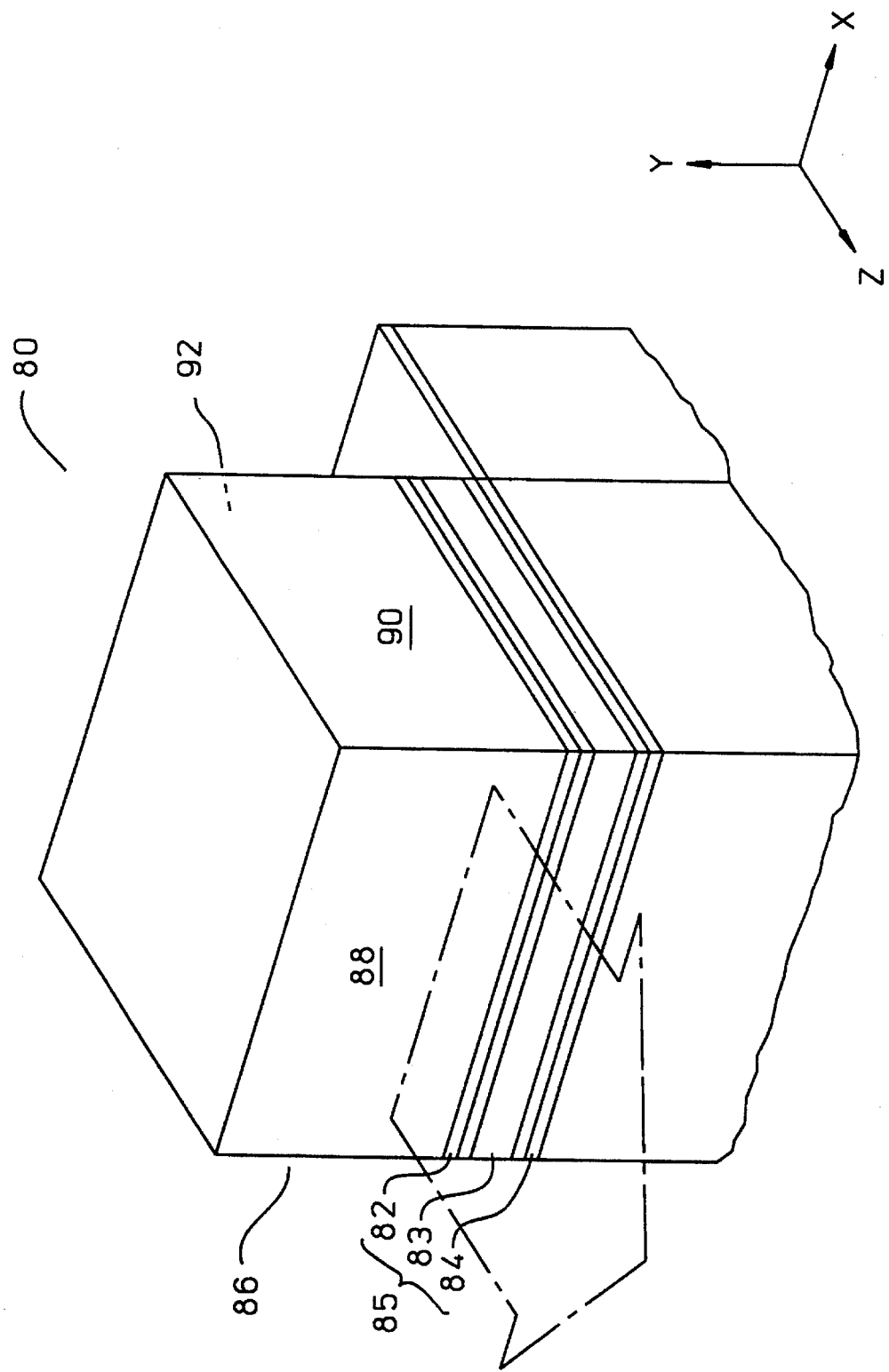
FIG. 4 shows another preferred embodiment of the present invention.

In yet another preferred embodiment, the top reflecting electrode 64 is changed to a top transparent electrode, which can be made of indium tin oxide or zinc oxide, and can be about 2000 Angstroms thick. In this embodiment, a cap is deposited on top of the transparent electrode. FIG. 4 shows such an embodiment 80, with a cap 86 on top of a thin-film stack 85,. The refractive index of the cap is substantially matched to the refractive index of the active film 83; the thickness of the cap (y-direction) is more than the thickness of the stack 85; and the attenuation of the radiation in the cap is less than the attenuation in the active film.

One side surface of the cap, known as the emitting side surface 88, is more transmissive than the other side surfaces, known as the reflecting surfaces such as 90. The cap increases the efficiency of the line source because a significant portion of the generated radiation instead of bouncing within the stack, propagates into the cap, and is directed towards the emitting side surface 88 of the cap 86. Such a line source has a higher efficiency than the first preferred embodiment because the cap is typically made of a material with a lower attenuation per unit length than the active film. With fewer internal reflections, such a line source provides a higher efficiency. In a modified version, the emitting side surface 88 is more transmissive than one of the side surfaces, the reflecting surface 92. The generated radiation is directed away from the reflecting side surface 92 towards the emitting side surface 88. For the example shown in FIG. 4, the emitting side surface 88 of the cap is substantially coplanar to one of the edges of the stack. In another modified version, the cap 86 extends beyond the stack 85; this enhances the manufacturability of the embodiment.

One can combine a number of the thin-film stacks described to increase power or to produce many colors. For example, three independent sources, a red, a green and a blue source, may be combined in a geometrical arrangement as illustrated in a prior art shown in FIG. 2A.

FIGS. 5(A–C) show a second preferred embodiment 100 of the present invention. It includes more than two thin-film electroluminescent stacks, 102, 104 and 106, on a reflecting film 110 over a substrate 112, such as glass. The embodiment 100 also includes a top cap 108 over the stacks.

Each thin-film stack has a bottom reflecting electrode, such as 120, an insulating film, such as 122, an active film, such as 124, another insulating film, such as 126, and a top transparent electrode, such as 128. In one embodiment, the three active films are made of different materials. In another embodiment, the three active films are made of the same materials; all of them emit white light. Then, filters, as will be described later, are put in to create different colors.

In the second preferred embodiment, a first filter film 130 is coupled to the first thin-film stack to filter the radiation from the stack 106 to the cap 108. A second filter film 132 is coupled to the second stack 104 to filter the radiation from the second stack 104 to the cap 108. In the embodiment, both filter films are on top of each stack, such as the first filter film 130 is on top of the transparent electrode 128.

The radiation propagated to the cap from each stack centers around a different wavelength. The three sets of radiation, when combined together, preferably can generate the desired color.

Typically, the refractive index of the active films are different from the refractive indices of the insulating films, the filter films and the transparent films. However, the insulating films, the filter films and the transparent films are quite thin relative to the wavelength of the radiation generated in the active film. Thus, the effect of the mismatch in refractive indices is very small.

Materials for the cap should be selected according to their electromagnetic properties. This includes their refractive indices, which should be similar to the index of the active film so as to enhance coupling of the radiation generated in the active films into the caps. Preferably, the refractive indices of both the active films and the caps should be high so as to promote internal reflection over a wide range of incident angles for the emitted radiation. The cap should be made of a material with less attenuation per unit length of the generated radiation than the active films. Other factors to consider are the manufacturability of the cap in the desired dimensions. This includes the achievable smoothness of the surfaces.

The cap 108 has four side surfaces, such as 136, 137 and 138, a top surface 140 and a bottom surface 142. One side surface is made more transmissive (the emitting side surface) than the other surfaces (the reflecting surfaces), such as the surface 136 is made more transmissive. This can be achieved through numerous methods, such as roughening the surface 136, plating a reflecting film on the surface 138 or other means known in the art. Roughing the surface can be achieved through different etching techniques, such as chemical or plasma etching. With such structures, the radiation entering the cap is directed to go out from the emitting side surface 136.

In the preferred embodiment, the thickness of the cap (y-direction) is much more than the thicknesses of the stacks. Also, the side surfaces of the stacks are made reflective, such as by plating each of them with a reflecting film. With such configurations, much of the radiation emitted from the second embodiment radiates from the emitting side surface 136 of the cap, and the amount of radiation emitted from the other surfaces is relatively low.

In one working embodiment, the cap is about 10 microns thick (y-direction), and is made of a chalcogenide glass. The other materials in each stack other than the active films are similar to those as described in the working example of the first embodiment.

Figure 5B:
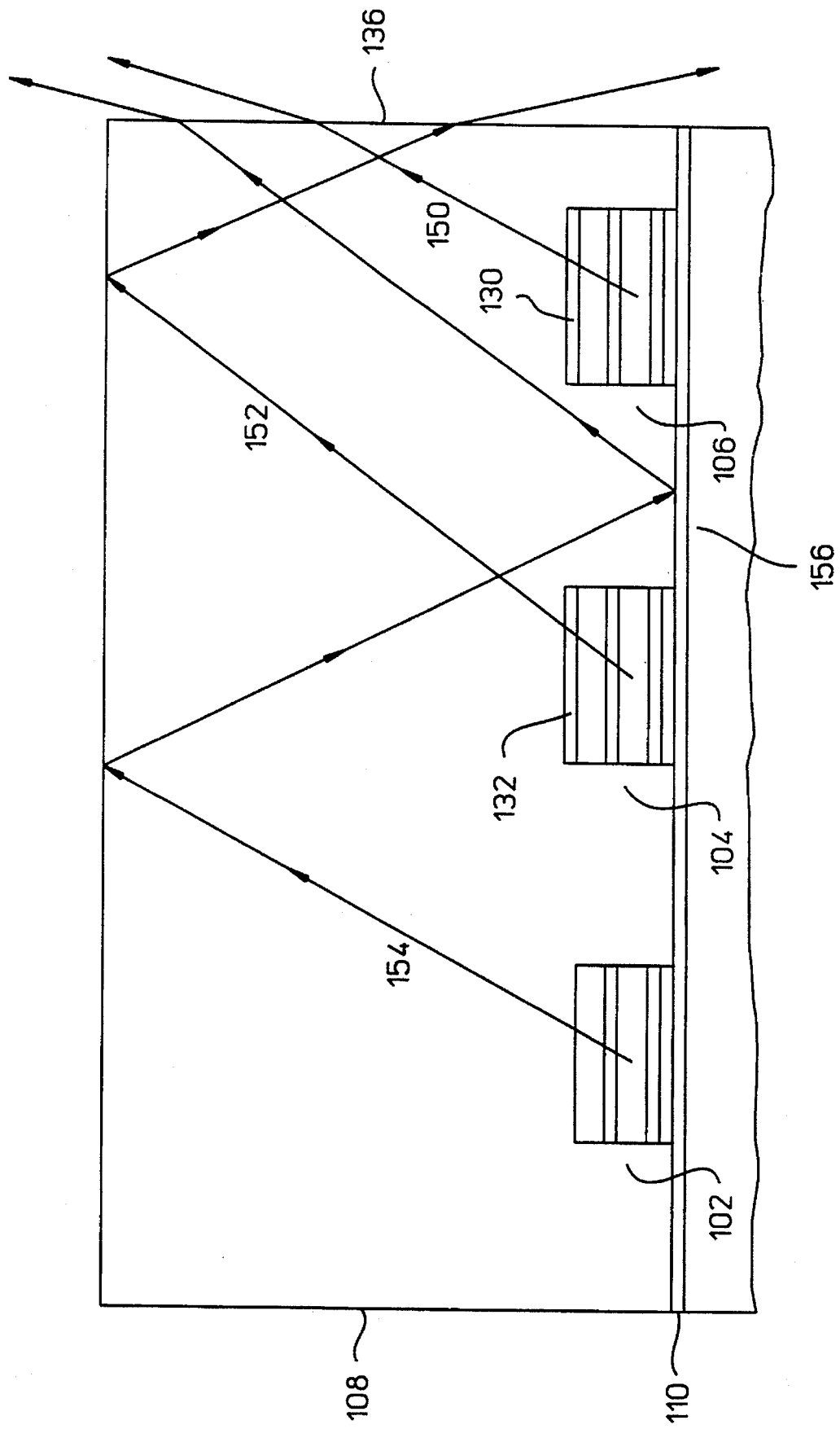
FIGS. 5(A–C) show a second preferred embodiment of the present invention.

FIG. 5B shows the radiation from the stacks in the second preferred embodiment. In one example, the active film in the first stack 106 is made of strontium sulphide doped with cerium$^{3+}$ to emit radiation in the blue-green regions. The first filter 130, made of a dyed polyimide, attenuates the blue radiation leaving the green 150 to be emitted from the stack into the cap 108. The active film in the second stack 104 is the same as the active film in the first stack. However, the second filter 132, made of a different dyed polyimide attenuates the green radiation leaving the blue 152 to be emitted from the stack into the cap 108. The active film in the third stack 102 is made of strontium sulphide doped with europium$^{2+}$ to emit radiation 154 in the red region from the stack into the cap 108.

Areas, such as 156, on the bottom surface 142 of the cap 108 are reflective. With such structures, the red, green and blue radiation propagated into the cap 108 is directed towards the emitting side surface 136 to be emitted from the second embodiment.

Figure 5C:
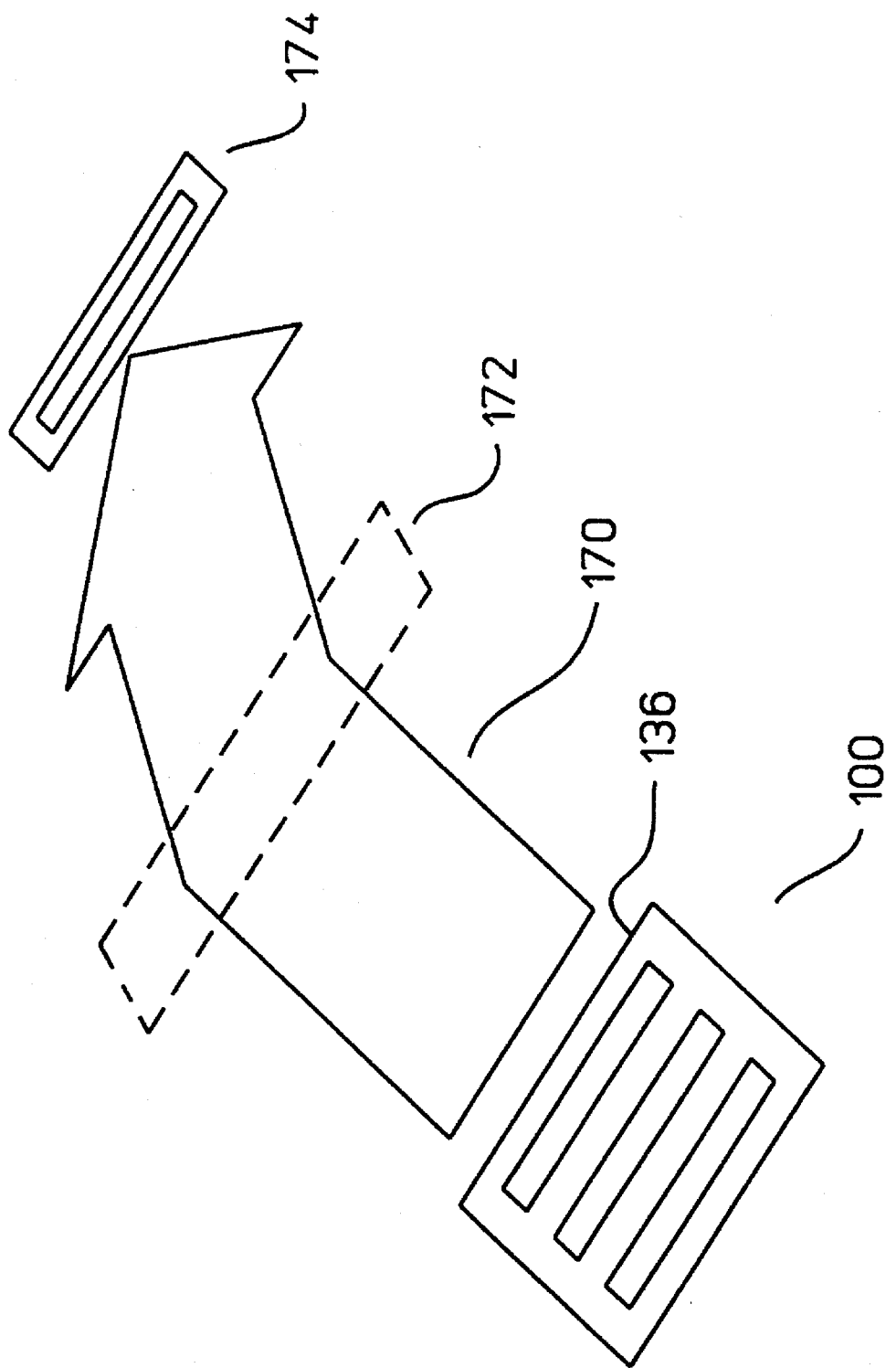

FIG. 5C shows a line radiation 170 from the second embodiment 100 emitted from the side surface 136 is incident on a piece of material 172. That line radiation reflects from the material 172 to the linear sensor 174, which may include many pixels.

In another embodiment, the reflecting film 110 is used as the bottom reflecting electrodes of the three stacks. In this situation, all three stacks have a common electrode.

In yet another embodiment, there is an extra layer of insulating film, such as a silicon dioxide layer, between the reflecting film 110 and the bottom electrodes of the three stacks. Another way to isolate the three stacks is not to have one common reflecting film 110, but to separate the films following the separation of the three stacks. Each stack sits on a reflecting film, and adjacent reflecting films are separated by a small gap, which can be filled by an insulating material, such as oxide.

In the second embodiment, the cap 108 is on top of the stacks. In another preferred embodiment, the stacks are on top of a cap, which is on a substrate, with a reflecting surface between the cap and the substrate. In this other embodiment, the bottom electrodes of the stacks are transparent, and the top electrodes are reflective; and the filter films are between their corresponding transparent electrodes and the cap. Preferably, there is a reflecting surface on the top surface of the cap in places where there are no stacks. Again, there is one side surface of the cap that is more transmissive than other surfaces, and that surface again is the emitting side surface.

Figure 6:
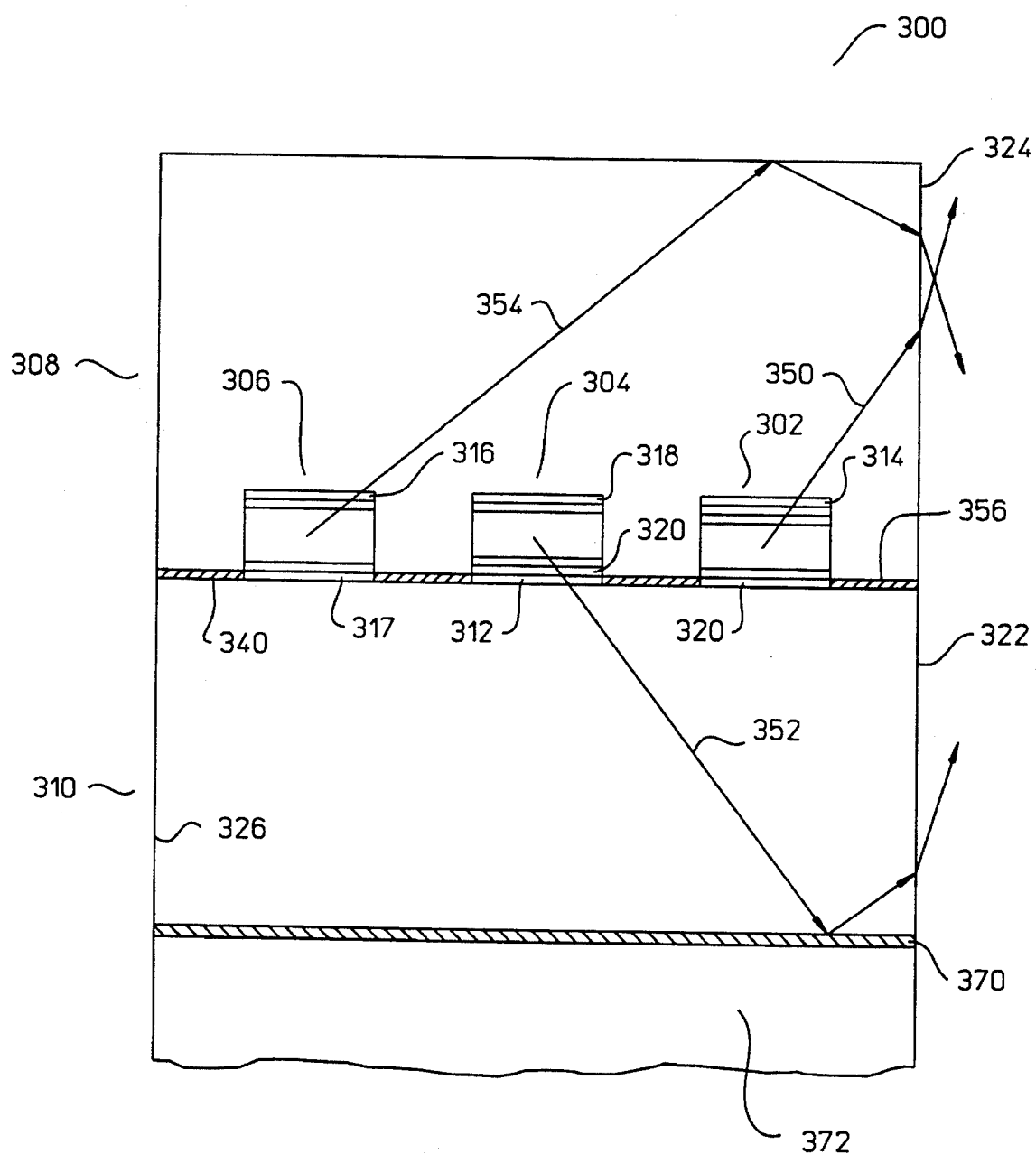
FIG. 6 shows a third preferred embodiment of the present invention.

FIG. 6 shows a third preferred embodiment 300 of the present invention. It includes two caps, 308 and 310, two or more thin-film stacks, such as 302, 304 and 306, and filter films, 312 and 314. The second cap 310 is on a reflecting film 370, which is on a substrate 372.

The three thin-film stacks and the first cap 308 in the third embodiment 300 are similar in structure to those of the second embodiment 100. However, the top 318 and the bottom 320 electrodes of the second thin-film stack 304 are reflecting and transparent electrodes respectively; and the filter film 312 coupled to the second stack 304 is between the bottom transparent electrode 320 and the second cap 322.

The materials and structures of the second cap 310 is similar to that of the first cap 308. The second cap has one side surface 322 that is more transmissive than the top surface 319 and the other side surfaces, such as 326. The more transmissive side surface (the emitting side surface) 322 of the second cap 310 is adjacent and parallel to the emitting side surface 324 of the first cap 308. The two emitting side surfaces 322 and 324 do not have to be flushed to one of the edges of the first stack. The two caps can extend beyond the thin-film stacks, as in the example shown in FIG. 6.

The radiation 350 from the first stack 302, centered around the blue region, emits from the emitting side surface 324 after being filtered by the first filter film 314. The material of the first filter 314 is similar to the material of the second filter 132 of the second embodiment. The radiation 352 from the second stack 304, centered around the green region, emits from the emitting side surface 322 after being filtered by the second filter film 3 12. One type of material for the second filter 312 is cadmium sulphide, which absorbs blue radiation and transmits green and red radiation. Finally, the radiation 354 from the third stack 306, centered around the red region, also emits from the emitting side surface 324.

The caps are thicker than the three stacks with the filter films. In one embodiment, the thickness of each cap is about ten times the thickness of each stack with its corresponding filter film. Moreover, the refractive indices of the caps are substantially matched to the refractive indices of the active films. Thus, most of the radiation generated propagates into the caps, instead of bouncing within the active films of each stack.

The third embodiment has one additional benefit as compared to the second embodiment. In the example discussed for the second embodiment, the blue radiation 152 from the second stack 104 may enter the first stack 106, and will then be attenuated by the first filter film 130. Similarly, the green radiation 150 from the first stack 106 may enter the second stack 104, and will be attenuated by the second filter film 132. However, in the example discussed in the third embodiment, if the blue radiation 352 from the second stack 304 is incident onto the first thin-film stack, the radiation will be reflected by the bottom reflecting electrode 320. Similarly, the green radiation 350 from the first stack 302 does not propagate into the second cap 310. This is again due to the reflecting bottom electrode 320. Hence, the third embodiment has a higher power efficiency than the second embodiment.

In the third preferred embodiment, areas, such as 356, on the top surface 340 of the second cap 310 that are not covered by the thin-film stacks are covered by a reflective film 356, such as an aluminum film.

The caps do not have to cover all three stacks. For example, by rearranging the stacks, one can group the first and third stacks together, and the first cap 308 only encapsulates those two stacks.

Figure 7:
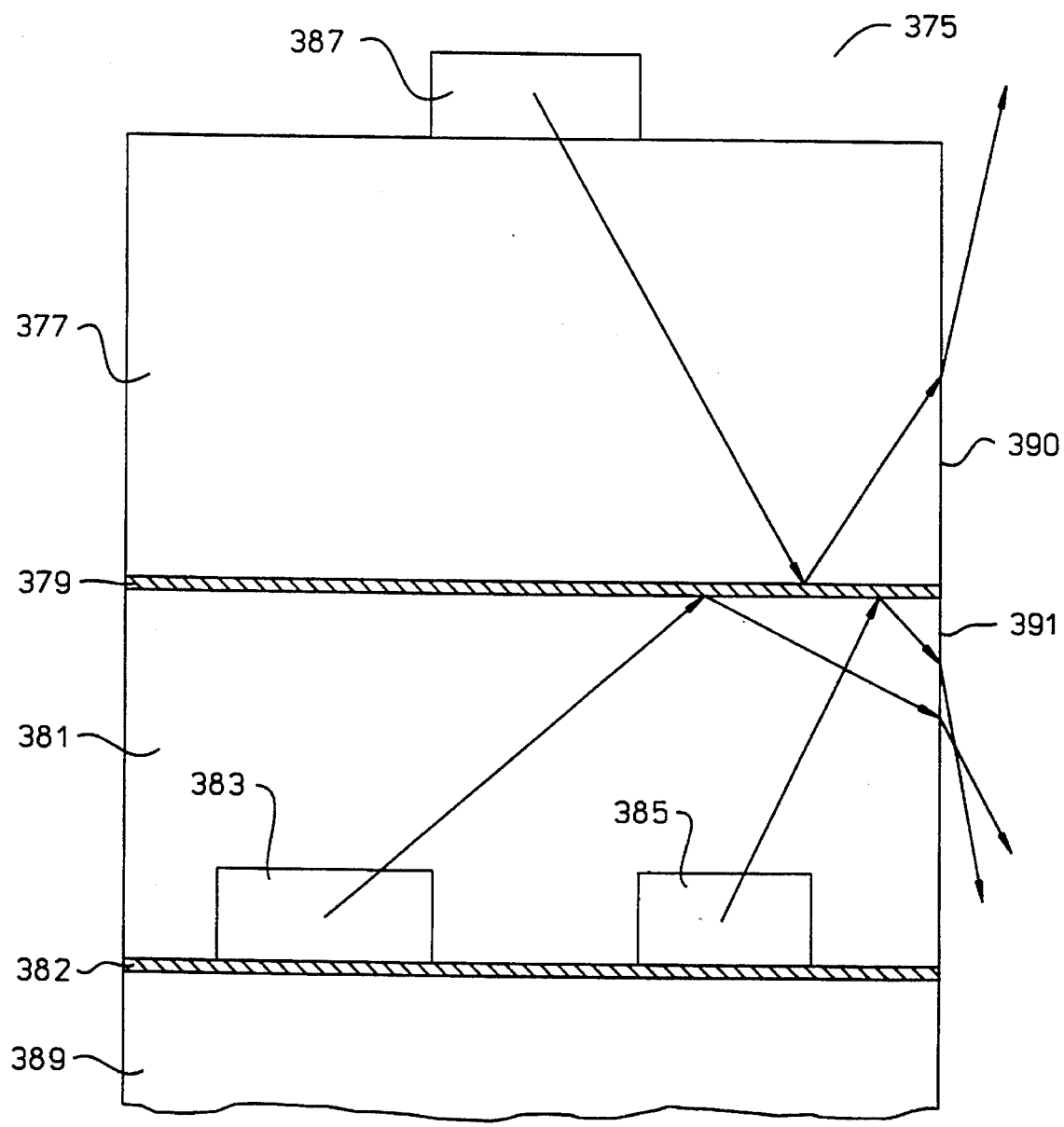
FIG. 7 shows a fourth preferred embodiment of the present invention.

Note that the three stacks in FIG. 6 do not have to be in the same cap. FIG. 7 shows a fourth preferred embodiment of the present invention 375. It again includes two or more stacks, such as 383, 385 and 387. One stack is on a first cap 377, and two stacks are encapsulated by a second cap 381, which is on a substrate 389 with a reflecting film 382. The two caps are separated by a reflecting film 379. The first stack 387 may be similar to the second stack 304 in the third embodiment 300. The second and the third stack, 383 and 385, may be similar to the first 302 and the third 306 stack in the third embodiment 300.

For the fourth embodiment, the stack 387 on the first cap 377 can be encapsulated by the cap 377, just as the second stack 383 being encapsulated by the second cap 381.

Figure 8:
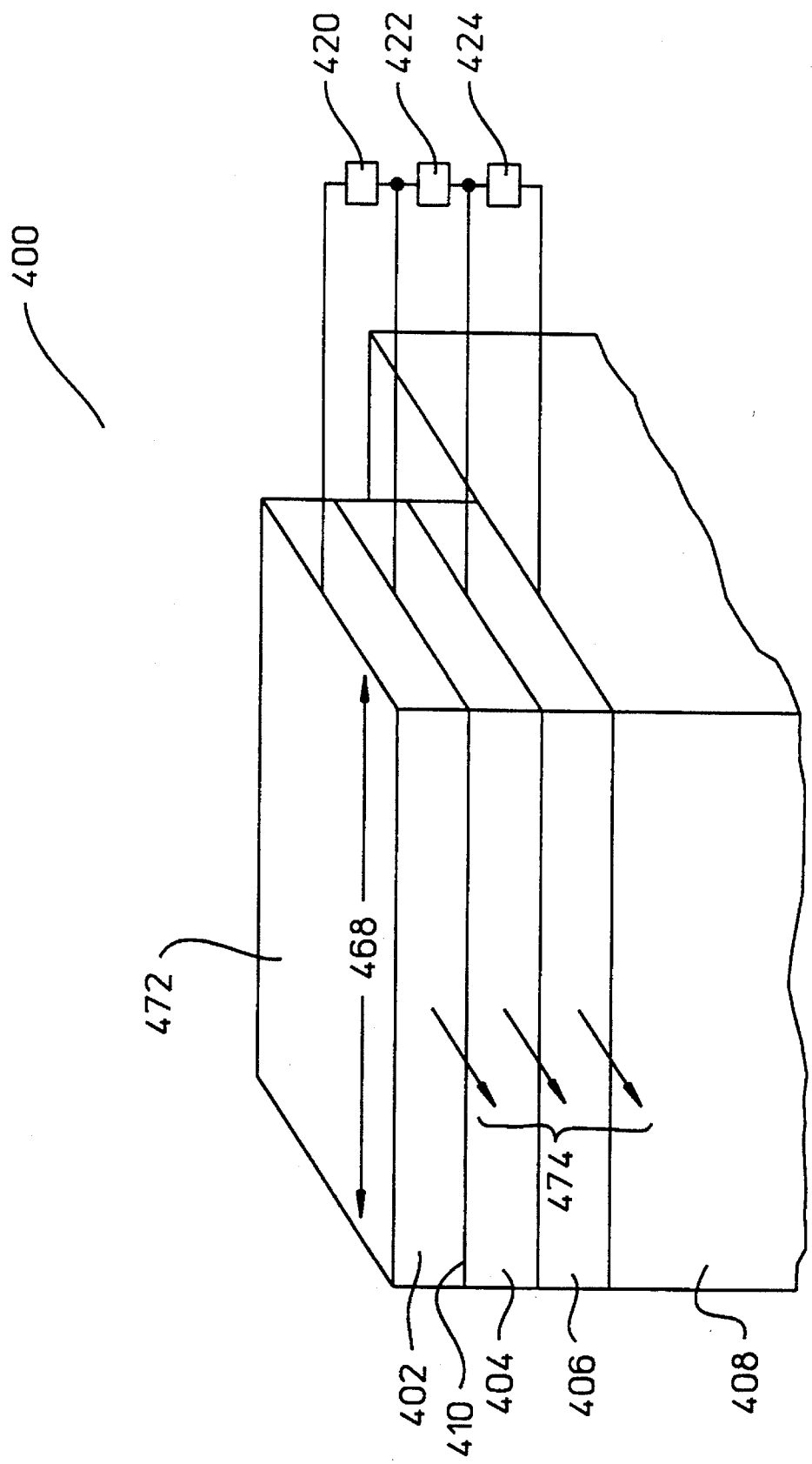
FIG. 8 shows a fifth preferred embodiment of the present invention.

FIG. 8 shows a fifth preferred embodiment 400 of the present invention. Again there are two or more stacks, such as 402, 404 and 406, but the stacks are positioned one on top of the other, without any cap in between, and the stacks are on a substrate 408. Each stack radiates one color.

Structurally, each stack is similar to the stack shown in FIG. 3, except that adjacent stacks may share a common electrode, such as the stack 402 and the stack 404 share the common electrode 410. Also, the bottom electrode of the stack 406 may extend over the surface of the substrate, as in FIG. 3.

The length 468 of the area 472 sets the length of the edge of the edge emitter 400, which sets the length of the lines of radiation 474 generated by the edge emitter 400.

Each stack is controlled by a voltage source, such as 420, 422 and 424. The voltage sources, which normally are alternating-current sources, create the electric fields for their corresponding electroluminescent devices. In one preferred embodiment, the voltage sources have built in switches, such as for the devices not being turned on, the voltage source is a short. For example, if the first stack 402 and the third stack 406 are turned on, but the second stack 404 is turned off, then the voltage source 422.is switched to a short.

Note that the elements in the embodiments may be mixed and matched. For example, a cap may be put in between two adjacent stacks in the fifth embodiment. The cap put in again has one surface that is more transmissive than the rest to guide the emitted radiation toward that surface.

In many embodiments of the present invention, color line sources are created, with the radiation coming out from the emitting side surfaces. The one or two caps gather, guide and re-direct significant portions of the radiation so that a higher percentage of the radiation generated by the stacks is emitted from the emitting side surfaces. With the emitting side surfaces around 10 microns tall, most of the radiation is perceived to be radiated from a line, which is the emitting side surfaces. So, the radiation from the emitting surfaces has a color that is the combination of the radiation from the three stacks. Thus, by electronically controlling the power of the radiation from each stack, one can control the color of the radiation from the emitting surfaces.

The line sources described in the present invention do not need warmup period. With the appropriate voltages applied to the electrodes, radiation will be generated. The line source is also very stable because it is based on electroluminescent effect.

In different situations, it might be beneficial to control the power from each stack to different levels. For example, sensors, such as charge coupled devices, may be more sensitive to a certain color. Radiation for that color may not need as much incident power. Another example is that filtering reduces power. It might be necessary to generate more power for the stacks with filters to compensate for the loss.

Figure 9:
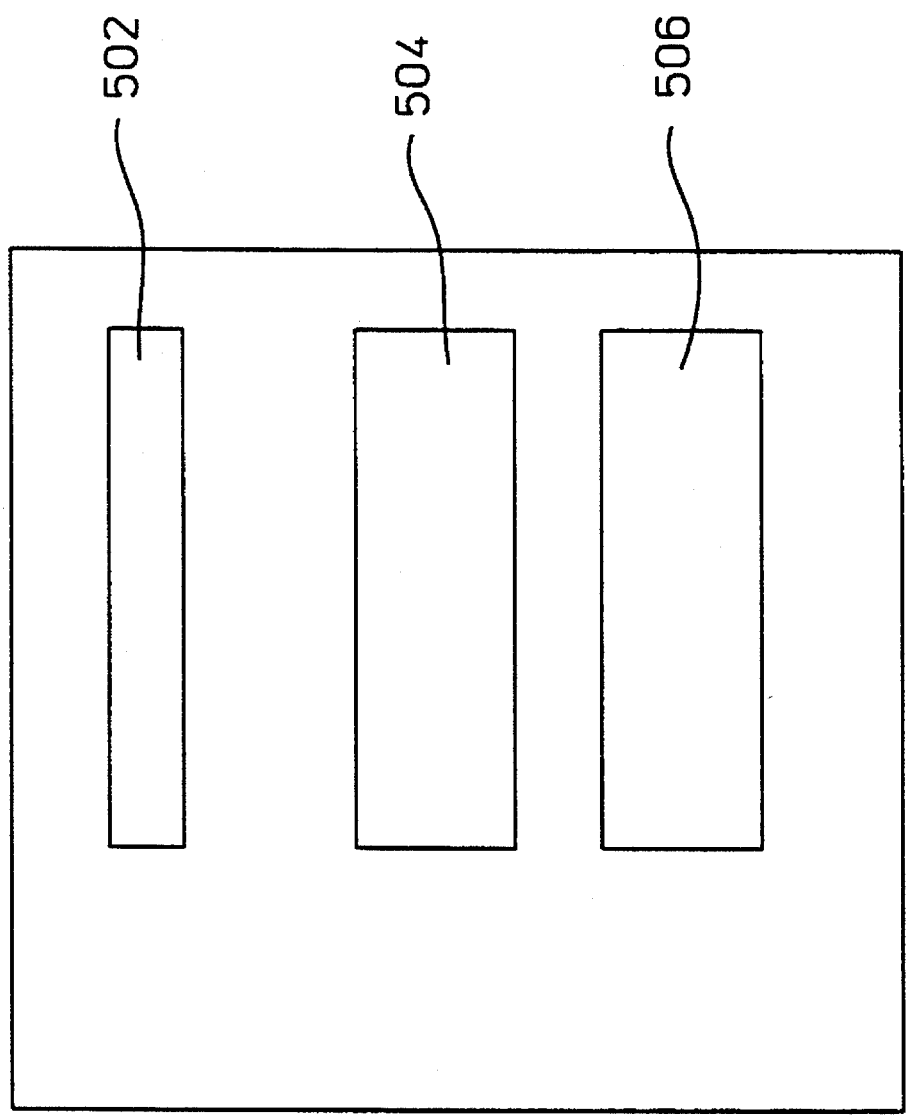
FIG. 9 shows one preferred embodiment of the present invention tailoring the powers from the thin-film stack.

Different methods may be used to control the power radiated from each stack. FIG. 9 shows the top view of the three stacks 502, 504 and 506, in one preferred embodiment. By controlling the area of each stack, one can tailor the power radiated from each stack to special needs. If one does not need as much power from the third stack 502, one can make the area of the third stack smaller than the other stacks.

Other methods to control the power of the radiation from each stack is to control the level and/or the frequency of the voltage applied to the electrodes on each stack. This will tailor the power of the radiation from each stack to the level one desires.

The three stacks do not have to be excited at the same time. In fact, one might prefer to excite them sequentially. Then one would need only one linear array of sensors to detect the emitted radiation. For example, if the line source is used as a scanner shining the radiation to a piece of document, as the line source shines onto the document, the linear array detects the reflected radiation, with each sensor element responsible for one pixel of the reflected image. With the three stacks excited sequentially, only one array of sensors is needed to measure the color of the image by synchronizing the sensors' circuitry to the firing frequency.

Conclusion

The present invention describes either a one-stack single color line source or a three-stack multi-color line source. However, based on the present invention, one can also create a color line source that covers a portion of a color gamut with two stacks. Structurally, the two-stack line source is similar to the second embodiment as shown in FIG. 4A. The difference is that there are only two stacks instead of three. The two stacks have different active films to emit different colors, for example, one for red and the other for blue-green. In such an embodiment, there will not be any filter films, and the transparent electrodes are in contact with the cap. Again, the radiation power from each stack may be controlled to set the color emitted from the emitting side surface. In another embodiment, there will be a filter film for one of the two stacks. In yet another embodiment with three stacks, there is only one filter film on one of the stacks.

For the color line sources, the preferred embodiments described do not have more than three stacks. However, the present invention is not limited to three or fewer stacks. The present invention is perfectly applicable to sources having more than three stacks. One or two caps are coupled to the stacks as in the above described embodiments to guide and re-direct the radiation towards the emitting side surfaces.

Note that the active film in the present embodiments may include additional active films such that the radiation from each film centers around a specific wavelength. As an example, one active film radiates in red and the other radiates in blue-green so that the combined radiation is perceived to be white.

The present invention describes many embodiments with three-stack color line sources using filter films, with active films generating a radiation with a certain color, such as red or blue-green. Other active films with similar or different filter films are equally applicable so that the different radiation from the different stack when combined can cover a large color gamut by electronically controlling the power of the radiation from each stack. An example of a large color gamut is one that encompasses the object color space. In one example, the three stacks with three different spectral distributions center around the three primary colors, red, green and blue.

In another embodiment, radiation from the stacks can combine to give a broadband white light source. The power distribution of such a source should cover the visible spectrum, and should not have any significant nulls within the distribution.

If the invention is used in a scanner, the stacks can act as color separators to give an accurate color reproduction of the material being detected. In fact, filter films may not be necessary if there are active films capable of generating colorimetrically adequate illumination. For example, the three stacks cover three different spectral distributions that are a good approximation to any linear combinations of the three CIE color matching functions.

The thin-film electroluminescent stack described is made of five films, which are the transparent electrode, the first insulating film, the active film, the second insulating film and the reflective electrode. However, other thin-film stacks may be used. For example, the stack may only have the first insulating film or may only have the second insulating film.

The present invention describes the emitting side surfaces having a higher transmission than the other side surfaces. In another embodiment, the emitting side surface has a higher transmission than at least one side surface, such as the surface 137, which is directly opposite to the emitting side surface 136 in FIG. 4A. This is achieved, for example, by roughening the emitting side surface, or by making one side surface reflective. With such a structure, the radiation generated has a certain preferred directivity; more radiation is emitted from the roughened surface than from the reflecting surface, or more radiation propagates along directions away from the reflecting surface.

Another improvement to the preferred embodiments is to curve the emitting side surfaces of the caps into a lens structure or to create a gradient-index lens or to create a diffractive optical element to generate lens action, so as to improve outcoupling and/or the angular distribution of the emitted radiation. Similar results may be achieved by Fresnel grooving the emitting side surface. Methods to achieve such curving or grooving is well-known to those skilled in the art and will not be further described.

Note that one or more lenses can be placed in front of the emitting surfaces to control the emitted radiation. For example, a lens may be placed adjacent to the stacks in FIG. 8 to further combine the radiation 474 to a narrower line. Another lens may be placed adjacent to the stack in FIG. 4 to expand the line so that it has a wider width.

The present invention describes the cap being a rectangular block. The cap may be made of other structures with more side surfaces.

Figure 10:
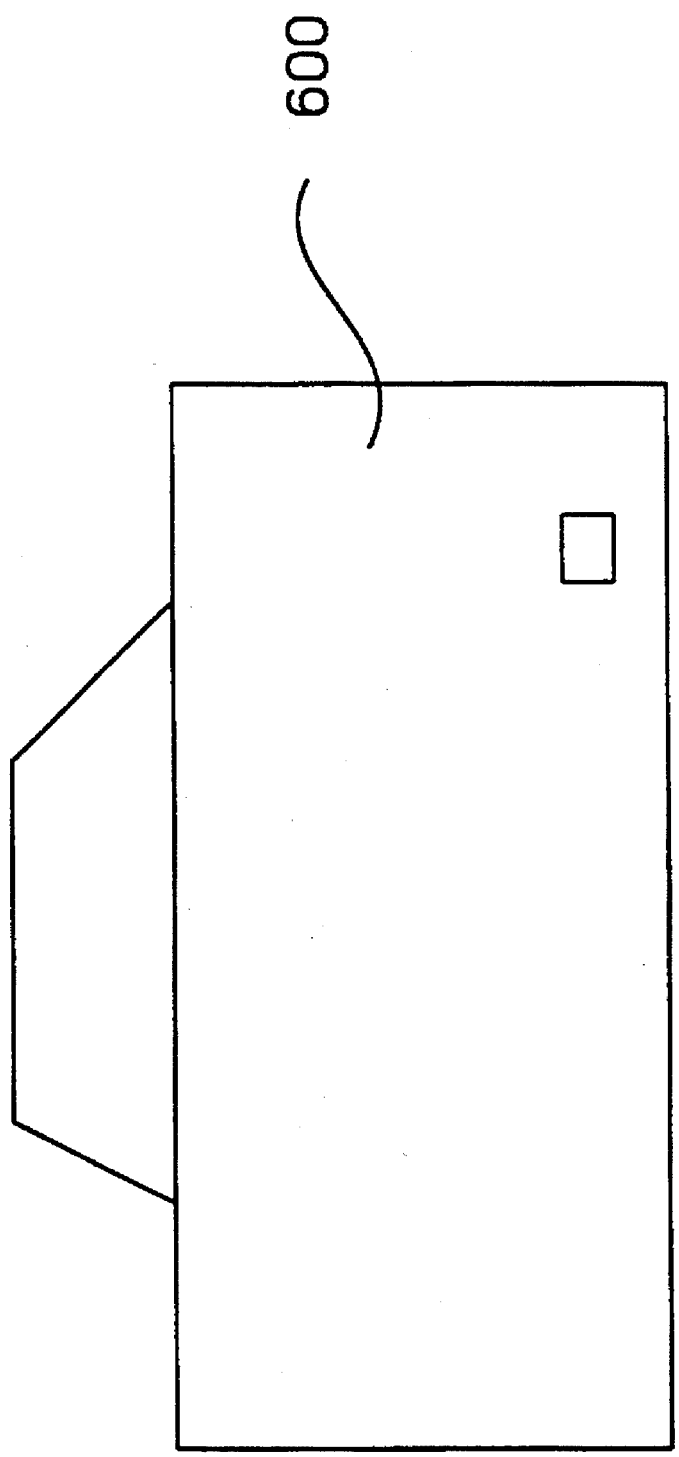
FIG. 10 shows a scanner using a preferred embodiment of the present invention.

The preferred embodiments can be used in a scanner 600 shown in FIG. 10. The scanner may be a desk-top scanner or a portable scanner. It may be used as a stand-alone scanner, or it may be incorporated in a copier, a fax machine or the "erase bar" of a printer. Such instruments should be well-known to those skilled in the art, and will not be further described in this application. In fact, the preferred embodiments can be used in any instrument that requires a broadband single-color or multi-color line source. If the scanner is used for a typical A4 size paper (8.5" by 11"), then the line source may need to be more than 8.5 inches in length.

The present invention is illustrated by one type of thin-film electroluminescent device with five films, namely, a first electrode, a first insulating film, an active film, a second insulating film and a second electrode. However, other types of thin-film electroluminescent devices, such as in a device where the films are thicker, may also be used.

In another embodiment, the filter films described in the present invention are replaced by fluorescent films. With the appropriate radiations generated in the active films incident on the fluorescent films, radiations with the desired color will emit.

Figure 11:
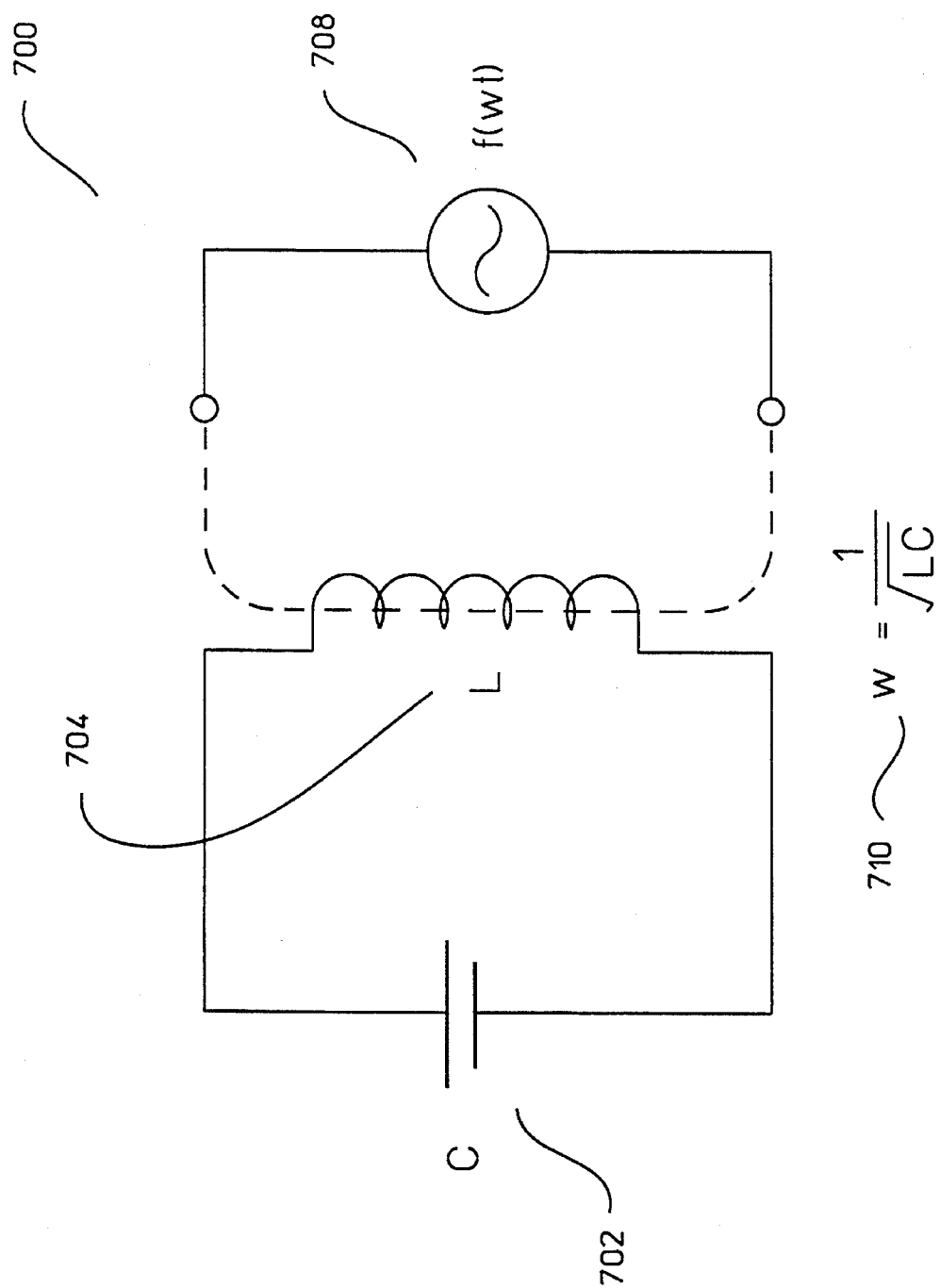
FIG. 11 shows a preferred approach to drive a preferred embodiment of the present invention.

There are different approaches to drive all the different embodiments. One preferred method 700 is shown in FIG. 11. In that example, an edge emitter, with its capacitance 702, is connected in parallel to an inductor 704. This inductor may be the secondary winding of a transformer. A voltage source 708 is coupled to the LC circuit to deliver power to the edge emitter. This coupling may be achieved by connecting the voltage source to the primary winding of the transformer. The radial frequency of the voltage source 708 is equal to the resonant frequency of the capacitance 702 and the inductor 704.

From the foregoing it will be appreciated that a single-color or multi-color broadband line source has been invented. The line source is directional and efficient because the emitting surface can be in the order of tens of microns wide. The line source is also very uniform, rugged and compact. Moreover, most probably, the invented line source is cheaper than a similar fluorescent lamp. Examples given in the disclosures are intended to be purely exemplary of using the invention. Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

I claim:

1. An edge emitter generating a line radiation, the emitter comprising:

a first thin-film electroluminescent stack comprising a first electrode, a second electrode, and a first active film between the two electrodes;

wherein:

the first electrode of the first stack is reflecting, and the second electrode is transparent; and the edge emitter further comprises a cap having a plurality of side surfaces, a top surface and a bottom surface;

such that:

the active film generates radiation in an area that has a width and a length, with the length being larger than the width;

the length of the area sets the length of the line radiation;

the line radiation is substantially homogenous along the line;

the bottom surface of the cap is in contact with the second electrode of the first stack;

the transmission of the generated radiation is higher on one side surface, known as the first emitting side surface, than at least one other surface, known as the first reflective surface, of the cap; and a higher percentage of the radiation from the active film entering the cap radiates from the emitting surface than from the reflective surface.

2. An edge emitter as recited in claim 1 further comprising:

a second thin-film electroluminescent stack comprising two electrodes and a second active film between the electrodes, which are a first electrode and a second electrode;

such that:

the first electrode of the second stack is the first electrode of the first stack;

the second active film generates radiation in an area that has a width and a length, with the length being larger than the width; and the radiation from the two stacks is centered at two different wavelengths.

3. An edge emitter as recited in claim 1 further comprising a second active film adjacent to the first active film such that the second active film generates radiation in an area that has a width and a length, with the length being larger than the width.

4. A scanner using an edge emitter as recited in claim 1 to scan a piece of material.

5. A circuit comprising:

an edge emitter as recited in claim 1, wherein the emitter has a capacitance;

an inductor connected in parallel to the edge emitter;

a voltage source coupled to the inductor and the edge emitter, wherein the radial frequency of the voltage source is equal to the resonant frequency of the inductor and the capacitance of the emitter.

6. An edge emitter generating a line radiation, the emitter comprising:

a first thin-film electroluminescent stack comprising a first electrode, a second electrode, and a first active film between the two electrodes, the first electrode of the first stack being transparent, and the second electrode being reflective;

a first cap having a plurality of side surfaces, a top surface and a bottom surface; and a second thin-film electroluminescent stack comprising a first transparent electrode, a second electrode, and a second active film between the two electrodes;

such that:

the active film generates radiation in an area that has a width and a length, with the length being larger than the width;

the length of the area sets the length of the line radiation;

the line radiation is substantially homogenous along the line;

the second active film has an area that has a width and a length, with the length being larger than the width;

the second stack is adjacent to the first stack;

the first cap is coupled to the transparent electrodes of the stacks;

a higher percentage of the radiation from the active films entering the cap radiates from the emitting surface than from the reflective surface; and the radiation from the emitting surface is perceived to have a color that is the combination of the radiation from the two stacks.

7. An edge emitter as recited in claim 6 further comprising:

a third thin-film electroluminescent stack comprising two electrodes and a third active film between the two electrodes, which are a first transparent electrode coupled to the cap and a second electrode;

a filter film coupled to the third thin-film stack to filter the radiation from the stack to the cap;

a different filter film coupled to the second thin-film stack to filter the radiation from the stack to the cap;

such that:

the third active film has an area that has a width and a length, with the length being larger than the width;

the third stack is adjacent to the second stack;

the transmission of the generated radiation is higher on the emitting surface than the reflective surface; and the radiation from the emitting surface is perceived to have a color that is the combination of the radiation from the three stacks.

8. An edge emitter as recited in claim 6 further comprising:

a third thin-film electroluminescent stack comprising two electrodes and a third active film between the electrodes, which are a first transparent electrode, and a second reflecting electrode coupled to the first cap;

a second cap coupled to the transparent electrode of the third stack;

a filter film coupled to the third stack filtering the radiation from the stack to the second cap; and a different filter film coupled to the second thin-film stack filtering radiation from the stack to the first cap;

such that:

the third active film has an area that has a width and a length, with the length being larger than the width;

the third stack is adjacent to the second stack;

the second cap has a plurality of side surfaces, a top surface and a bottom surface;

the transmission of the generated radiation from the third stack is higher on one side surface, known as the second emitting side surface, of the second cap than on at least one other side surface, known as the second reflecting surface, of the second cap;

the radiation from the emitting surfaces is perceived to have a color that is the combination of the radiation from the three stacks.

9. An edge emitter as recited in claim 6 further comprising:

a reflecting film on the top surface of the first cap;

a second cap with a plurality of side surfaces, a top surface and a bottom surface coupled to the reflecting film on the top surface of the first cap;

a third thin-film electroluminescent stack comprising two electrodes and a third active film between the two electrodes, which are the first transparent electrode coupled to the second cap, a second electrode;

a filter film coupled to the third stack filtering the radiation from the third stack to the second cap; and a different filter film coupled to the second thin-film stack filtering radiation from the stack to the first cap;

such that:

the third active film has an area that has a width and a length, with the length being larger than the width;

the transmission of the generated radiation from the third stack is higher on one side surface, known as the second emitting side surface, of the second cap than on at least one other side surface, known as the second reflecting surface, of the second cap; and the radiation from the emitting surfaces is perceived to have a color that is the combination of the radiation from the three stacks.

10. An edge emitter as recited in claim 8, wherein the area of each stack is sized to control the power of the radiation from each film stack.

11. An edge emitter as recited in claim 8, wherein:

the generation of radiation from each stack is controlled by a voltage source; and the voltage level of each voltage source is tailored to control the power of the radiation from each stack.

12. An edge emitter as recited in claim 8, wherein:

the generation of radiation from each film stack is controlled by a voltage source; and the frequency of each voltage source is tailored to control the power of the radiation from each stack.

13. An edge emitter as recited in claim 8, wherein the top surface of the second cap that is not covered by the film stacks, is coated by a reflective film.

14. An edge emitter as recited in claim 8, wherein the radiation from the three stacks covers three spectral distributions that can be combined to cover a large color gamut by electronically controlling the power of the radiation from each stack.

15. An edge emitter as recited in claim 8 wherein the radiation from the three stacks covers three spectral distributions that can be combined to produce a broadband white light.

16. A scanner using an edge emitter as recited in claim 8 to scan a piece of material.

17. An edge emitter as recited in claim 16 wherein the stacks act as color separators to give an accurate color reproduction of the material being scanned.

18. An edge emitter generating a line radiation, the emitter comprising:

a first thin-film electroluminescent stack comprising a first electrode, a second electrode, and a first active film between the two electrodes;

a first cap having a plurality of side surfaces, a top surface and a bottom surface;

a second thin-film electroluminescent stack comprising two electrodes and a second active film between the two electrodes, which are a first transparent electrode and a second electrode; and a filter film coupled to the second thin-film stack;

such that:

the active film of the first stack generates radiation in an area that has a width and a length, with the length being larger than the width;

the length of the area sets the length of the line radiation;

the line radiation is substantially homogenous along the line;

the second active film has an area that has a width and a length, with the length being larger than the width;

the second stack is adjacent to the first stack;

the first cap is coupled to the transparent electrodes of the stacks;

the filter film filters the radiation from the second stack to the cap;

the transmission of the generated radiation is higher on one side surface, known as the first emitting side surface, than at least one other surface, known as the first reflective surface, of the cap;

a higher percentage of the radiation from the active films entering the cap radiates from the emitting surface than from the reflective surface; and the radiation from the emitting surface is perceived to have a color that is the combination of the radiation from the two stacks.

19. An edge emitter generating a line radiation, the emitter comprising:

a first thin-film electroluminescent stack comprising a first electrode, a second electrode, and a first active film between the two electrodes, the first electrode of the first stack being transparent, and the second electrode being reflective;

a first cap having a plurality of side surfaces, a top surface and a bottom surface;

a second thin-film electroluminescent stack comprising two electrodes and a second active film between the two electrodes, which are a first transparent electrode and a second electrode; and a third thin-film electroluminescent stack comprising two electrodes and a third active film between the two electrodes, which are a first transparent electrode and a second electrode; and a filter film coupled to the third thin-film stack;

such that:

the active film of the first stack generates radiation in an area that has a width and a length, with the length being larger than the width;

the length of the area sets the length of the line radiation;

the line radiation is substantially homogenous along the line;

both the second and the third active film have an area that has a width and a length, with the length being larger than the width;

both the second and the third stack are adjacent to the first stack;

the first cap is coupled to the transparent electrodes of the stacks;

the filter film filters the radiation from the third stack to the cap;

the transmission of the generated radiation is higher on one side surface, known as the first emitting side surface, than at least one other surface, known as the first reflective surface, of the cap;

a higher percentage of the radiation from the active films entering the cap radiates from the emitting surface than from the reflective surface; and the radiation from the emitting surface is perceived to have a color that is the combination of the radiation from the three stacks.

20. An edge emitter generating a line radiation, the emitter comprising:

a thin-film electroluminescent stack comprising a reflecting electrode, a transparent electrode, and an active film between the two electrodes; and a cap having a plurality of side surfaces, a top surface and a bottom surface, with the transparent electrode being in between the cap and the active film;

such that:

the active film generates radiation in an area that has a width and a length, with the length being larger than the width;

the length of the area sets the length of the line radiation;

the transmission of the generated radiation is higher on one side surface, known as the emitting side surface, than at least one other surface, known as the reflective surface, of the cap; and a higher percentage of the radiation from the active film entering the cap radiates from the emitting side surface than from the reflective surface.

* * * * *